(12) United States Patent
Luhrs et al.

(10) Patent No.: US 8,057,900 B2
(45) Date of Patent: Nov. 15, 2011

(54) MATERIAL WITH CORE-SHELL STRUCTURE

(75) Inventors: Claudia Luhrs, Rio Rancho, NM (US); Monique N. Richard, Ann Arbor, MI (US); Aaron Dehne, Maumee, OH (US); Jonathan Phillips, Rio Rancho, NM (US); Kimber L. Stamm, Ann Arbor, MI (US); Paul T. Fanson, Brighton, MI (US)

(73) Assignees: Toyota Motor Engineering & Manufacturing North America, Inc., Erlanger, KY (US); Regents of the University of New Mexico, Albuquerque, NM (US)

( * ) Notice: Subject to any disclaimer, the term of this patent is extended or adjusted under 35 U.S.C. 154(b) by 549 days.

(21) Appl. No.: 12/142,974

(22) Filed: Jun. 20, 2008

(65) Prior Publication Data
US 2009/0317637 A1     Dec. 24, 2009

(51) Int. Cl.
*B32B 5/66* (2006.01)
(52) U.S. Cl. ........ 428/403; 428/404; 428/405; 428/406; 428/407; 428/323; 428/327; 428/328
(58) Field of Classification Search .......... 428/403–407, 428/328, 323, 327
See application file for complete search history.

(56) References Cited

U.S. PATENT DOCUMENTS

| | | | |
|---|---|---|---|
| 5,908,715 A | 6/1999 | Liu et al. | |
| 5,989,648 A | 11/1999 | Phillips | |
| 6,238,821 B1 | 5/2001 | Mukherjee et al. | |
| 6,261,484 B1 | 7/2001 | Phillips et al. | |
| 6,406,814 B1 | 6/2002 | Gorkovenko et al. | |
| 6,652,822 B2 | 11/2003 | Phillips et al. | |
| 6,689,192 B1 * | 2/2004 | Phillips et al. | 75/342 |
| 6,755,886 B2 | 6/2004 | Phillips et al. | |
| 6,908,706 B2 | 6/2005 | Choi et al. | |
| 6,989,195 B2 | 1/2006 | Anderson | |
| 6,998,103 B1 | 2/2006 | Phillips et al. | |
| 7,053,021 B1 | 5/2006 | Zhong et al. | |
| 7,381,465 B2 * | 6/2008 | Torimoto et al. | 428/403 |
| 2007/0075052 A1 | 4/2007 | Fanson et al. | |

FOREIGN PATENT DOCUMENTS

EP        001479649 A1     11/2004

* cited by examiner

*Primary Examiner* — Leszek Kiliman
(74) *Attorney, Agent, or Firm* — Gifford, Krass, Sprinkle, Anderson & Citkowski, P.C.

(57) ABSTRACT

Disclosed is a material having a composite particle, the composite particle including an outer shell and a core. The core is made from a lithium alloying material and the outer shell has an inner volume that is greater in size than the core of the lithium alloying material. In some instances, the outer mean diameter of the outer shell is less than 500 nanometers and the core occupies between 5 and 99% of the inner volume. In addition, the outer shell can have an average wall thickness of less than 100 nanometers.

18 Claims, 2 Drawing Sheets

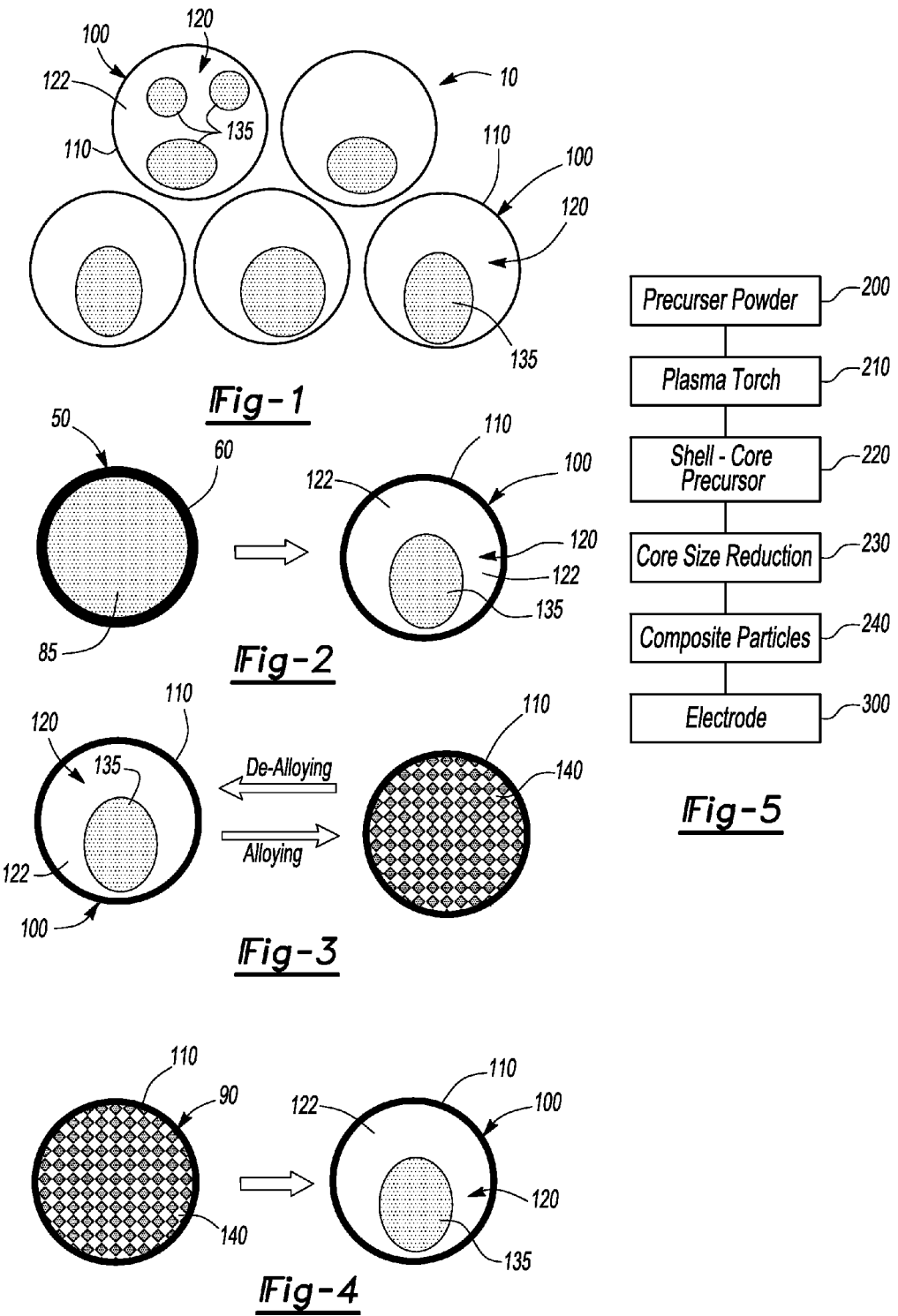

MATERIAL WITH CORE-SHELL STRUCTURE

GOVERNMENT INTEREST

This invention was made with government support under Contract No. DE-AC52-06NA25396 awarded by the U.S. Department of Energy. The government has certain rights in the invention.

FIELD OF THE INVENTION

The present invention relates to a material, in particular to a material having a core-shell structure.

BACKGROUND OF THE INVENTION

The energy requirements for batteries are continually increasing, while constraints on volume and mass continue to be present. Further, the demand for safe, low cost and environmentally friendly materials is increasing. These demands and battery specifications cannot be met using traditional lithium-ion battery chemistries. Although lithium-ion batteries have long been optimized and have demonstrated stable energies, these systems are limited by the amount of lithium that can be reversibly inserted and removed from the battery's active material structure.

The requirements for greater performance, safety, low cost and environmentally friendly materials can only be achieved through the development of new battery materials. Researchers have proposed the replacement of the carbon-based anode with tin. Tin alloys with lithium during the charging of the battery. The lithium-tin alloy forms a maximum concentration of 4.4 lithium atoms per tin atom, a concentration which equals a capacity of 993 mAh/g. A traditional carbon-based anode has a theoretical capacity of 372 mAh/g. Therefore, the replacement of traditional carbon-based anode batteries with tin-based anode batteries could result in higher energy capabilities.

Research has demonstrated that there are two main issues with the use of a tin-based anode. The first is a poor cycle life and the second is a poor utilization of the tin. A poor cycle life is defined as poor retention of battery energy as a function of the number of charge-discharge cycles. Researchers have taken two approaches to solving these problems. First, by forming an intermetallic compound of tin and at least one other metal, and second, by adding a non-electrochemically active material to the anode composite. However, the prior research has failed to address the fundamental causes of the poor performance of lithium-tin batteries, which are: 1) a large volume expansion of the tin-lithium particles resulting from the alloying of lithium with tin on charge; and 2) the breaking apart of tin agglomerates during the above-stated volume expansion. The volume expansion results in separation of the tin particles from the matrix during subsequent cycles and breaking of tin agglomerates results in fine particles with exposed fresh surface area. This fresh surface area is not in contact with the matrix, and thus like the separation of tin particles from the matrix, results in decrease in battery capacity. Therefore, there is a need for a lithium-tin battery that exhibits adequate cycle life and proper utilization of the tin.

SUMMARY OF THE INVENTION

Disclosed is a material having a composite particle, the composite particle including an outer shell and a core. The core is made from a lithium alloying material and the outer shell has an inner volume that is greater in size than the core of the lithium alloying material. The inner volume can include two separate volumes—a first volume of solid material and a second volume of void space. In some instances, the outer mean diameter of the outer shell is less than 500 nanometers and the core occupies between 5 and 99% of the inner volume. In addition, the outer shell can have an average wall thickness of less than 100 nanometers.

BRIEF DESCRIPTION OF THE DRAWINGS

FIG. 1 is a schematic cross-sectional view of a material according to an embodiment of the present invention;

FIG. 2 is a schematic cross-sectional view representing a step for making an embodiment of the present invention;

FIG. 3 is a schematic cross-sectional view illustrating the affect of alloying and de-alloying of a core of on an embodiment of the present invention;

FIG. 4 is a schematic cross-sectional view illustrating a different step for making an embodiment of the present invention;

FIG. 5 is a flow diagram illustrating a method for producing an embodiment of the present invention;

DETAILED DESCRIPTION OF THE INVENTION

Figure 6:
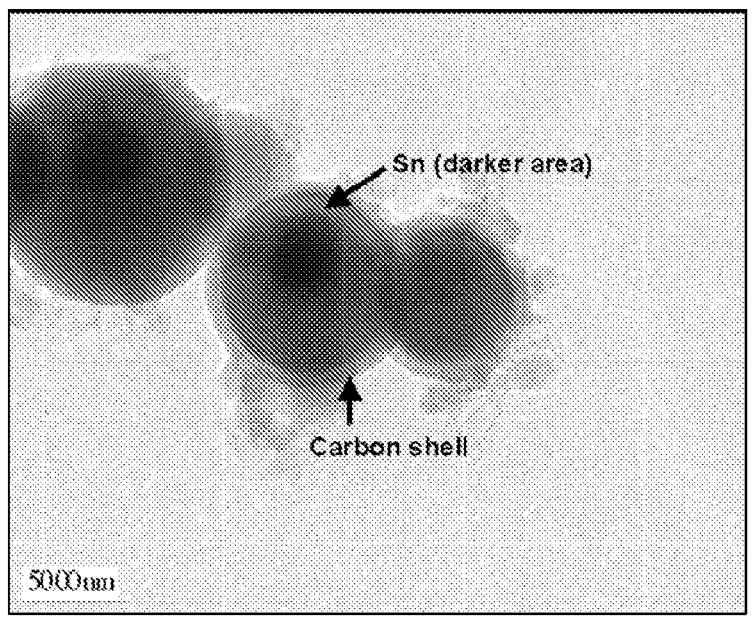
FIG. 6 is a transmission electron microscopy image of a carbon outer shell having a tin core.

The present invention includes a material made from a composite particle, the composite particle having an outer shell with a core within the outer shell. The outer shell has an inner volume that is greater than the core and the inner volume can include two separate volumes—a first volume of solid material and a second volume of void space. It is appreciated that the term 'void space' refers to space or volume where no solid matter is present, but in which gas and/or liquid can be present. As such, the inner volume of the outer shell can contain at least two phases, a solid phase that is at least partially made from a material that is capable of alloying with lithium and a non-solid phase made from a gas and/or liquid. It is thus appreciated that the inner volume is greater than a volume of the solid phase. In some instances, the core is solid when it is at a temperature below the solid's melting point. For example, the core can be made from a lithium alloying material, illustratively including tin, a binary tin alloy, a ternary tin alloy and the like, at temperatures below 100° C. The composite particle can have a mean outer diameter of less than 500 nanometers, an average wall thickness of less than 100 nanometers and the core of the lithium alloying material can occupy between 5 and 99% of the inner volume within the outer shell. It is appreciated that a plurality of composite particles can be assembled to make an electrode, the electrode being part of an electrochemical device. As such, the present invention has utility as a material for use in an electrochemical device.

A method is also disclosed for producing the composite particle. The method includes providing a precursor powder having components of the outer shell and the core. The powders of the precursor material are suspended in a gas to form an aerosol and then passed through a plasma torch. Passing the precursor powders through the plasma torch produces a shell-core precursor wherein the core occupies generally 100% of the inner volume of the outer shell. The core is then reduced in size in order to produce an outer shell having a core that occupies from 5 to 99% of the inner volume of the outer shell. If so desired, a plurality of the composite particles can be assembled, for example with a binder, to produce an electrode.

Turning now to FIG. 1, a material made from a composite particle according to an embodiment of the present invention is shown generally at reference numeral 10. The material 10 includes a composite particle 100, the particle 100 having an outer shell 110, an inner volume 120 and a core 135. It is appreciated that the inner volume 120 can include two separate volumes—a first volume of the core 135 and a second volume of void space 122. As illustrated in this figure, the core 135 has a size that is less than the inner volume 120 within the outer shell 110. In some instances, the outer shell 110 will have the shape of a sphere, however this is not required.

The core 135 can be made from a lithium alloying material, illustratively including tin, a binary tin alloy, a ternary tin alloy and the like. In some instances, the core 135 can include a tin-copper alloy. In the alternative, the lithium alloying material does not have to include tin. In other instances, the core 135 contains a lithium alloying element(s) such as tin, silicon, aluminum, germanium, copper and combinations thereof. In any event, the core 135 can occupy between 5 to 99% of the inner volume 120. The outer shell 110 can be made from a variety of materials. For example, materials such as oxides, carbonates, halides, carbides, graphite, grapheme, anthracene and amorphous carbon can be used to form the outer shell of a composite particle so long as the resulting outer shell is an electronic conductor, an ionic conductor, and/or a mixed conductor.

The outer mean diameter of the composite particle 100 is less than 500 nanometers. In some instances, the outer mean diameter of the composite particle 100 is less than 200 nanometers while in other instances the outer mean diameter is less than 100 nanometers. In still yet other instances, the outer mean diameter of the composite particle 100 is less than 50 nanometers. The average wall thickness of the outer shell 110 is less than 100 nanometers, can be less than 50 nanometers, and in some instances is less than 20 nanometers.

Turning now to FIG. 2, a schematic illustration of a step in a process that produces the composite particle 100 is shown. In this figure, a precursor composite particle 50 has an outer shell 60 with a core 85. The outer shell 60 and the core 85 can have the same general chemical composition as the outer shell 110 and the core 135 of the composite particle 100. As illustrated by the arrow shown in FIG. 2, the core 85 of the composite particle 50 is reduced in size such that the composite particle 100 is produced. It is appreciated that the outer shell 60 and the core 85 do not have to have the same general chemical composition as the outer shell 110 and the core 135, with the final composition of the outer shell 110 and core 135 obtained during processing of the composite particle 50 into the composite particle 100.

Turning now to FIG. 3, a schematic illustration is shown wherein the core 135 of the composite particle 100 undergoes alloying with lithium, e.g. during a charging stage of an electrochemical device, thereby resulting in a core 140. The core 140 can have an expanded volume that occupies up to 100% of the inner volume 120. Upon discharging of the electrochemical device, the core 140 is de-alloyed and reduced back to the core 135. In this manner, the core 135 made from a lithium alloying material can undergo charging and discharging cycles with an associated volume expansion and contraction, respectively, without failure of the outer shell 110. In so doing, the core 135 and/or 140 remains in contact with the outer shell 110 and affords an electrode with improved cycling capacity.

FIG. 4 illustrates an alternate step to produce the composite particle 100. In this embodiment, a precursor composite particle 90 is produced having the outer shell 110 and a core 140, the core 140 occupying generally all of the inner volume 120 of the outer shell 110. The core 140 can be at least partly a pre-lithiated alloy represented by the formula Li—X, where X is any element or combination of elements that alloy with lithium. It is appreciated that the core 140 can also contain other material and/or elements that do not alloy with lithium. Once the precursor composite particle 90 has been provided, the lithium within the core 140 is dealloyed therefrom in order to produce the composite particle 100 having the lithium alloying material core 135. In this manner, an electrode can be provided such that the initial discharge of the electrochemical device, e.g. a battery, affords for the production of the composite particle 100.

A method for producing the material disclosed herein is illustratively shown in FIG. 5. The method includes providing a precursor powder at step 200 and passing the precursor powder through a plasma torch at step 210. Upon passing the precursor powder through the plasma torch at step 210, a shell-core precursor powder is produced at step 220, e.g. a plurality of composite particles 50 illustrated in FIG. 2. After the shell core precursor powders have been produced at step 220, the core is reduced in size at step 230, thereby providing the shell-core composite particles having an inner volume greater than the core at step 240. Such a shell-core composite particle is illustrated as the composite particle 100 in FIG. 2. If so desired, an electrode can be made from the composite particles produced at step 240 at step 300.

In order to better illustrate the embodiments described above, an example of a composite particle and a method of manufacture is provided.

Example

In an attempt to produce a carbon shell-tin core composite particle, a dry precursor powder was prepared having a tin to anthracene ratio of 50:1. It is appreciated that other aromatic coke forming compounds such as naphthalene or acenaphthalene can be used for providing the carbon material. The precursor powder was suspended in an argon gas, thereby producing an aerosol gas of argon with anthracene and tin. The aerosol gas was passed through a low power atmospheric or near atmospheric pressure plasma with microwave energy focused within a coupler. It is appreciated that plasmas generated using other methods can also be used. In addition to the aerosol gas, a second supply of argon gas was passed through the plasma area. Though not being bound by theory, the inventors postulate that upon passing through the plasma hot zone, the carbon within the precursor powder undergoes a carbonization mechanism forming carbon fragments. In addition, the tin within the precursor powder melts and upon cooling forms particles via a nucleation process. The carbon fragments collect on the same nuclei as the tin and based on relative miscibility segregate to the nuclei surface. The nucleating particles exit from the hot zone into an afterglow region in which no further growth occurs.

FIG. 6 shows a transmission electron microscopy image wherein a composite particle having a carbon outer shell and a tin core was produced using the anthracene-tin precursor powder, an argon aerosol gas flow rate of 300 cubic centimeters per minute (cc/min), an argon plasma gas flow rate of 200 cc/min and a forwarded microwave power of 900 watts. As shown in this figure, composite particles having an outer mean diameter of between 50 to 100 nanometers were produced with a carbon outer shell and a tin core. At this step of the process, the tin core essentially occupies all of the inner volume within the carbon outer shell.

Figure 7:
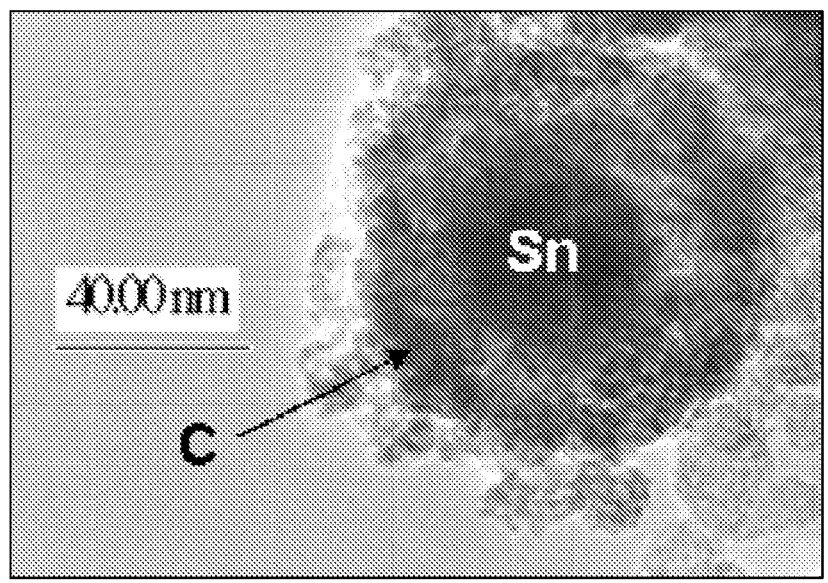
FIG. 7 is a transmission electron microscopy image of a composite particle having a carbon outer shell and a tin core occupying between 5 and 99% of an inner volume of the outer shell.

After the carbon-tin precursor powders were produced, said core-shell particles were subjected to a non-acid treatment that resulted in the partial dissolution of the tin core within the carbon outer shell. In particular, carbon-tin precursor composite particles were reacted with a basic solution. After such treatment, the tin cores that were present within the carbon outer shells as shown in FIG. 6 were reduced in size as illustrated in FIG. 7. In this manner, composite particles were produced having necessary vacant space within an outer shell for the tin core to expand during lithium alloying without damage to the outer shell. It is appreciated that oxidants could also be employed to accelerate the reaction.

It is appreciated that the example given above is for illustrative purposes only and other methods are included that produce a composite particle having an outer shell with a core, the core being of reduced size such that expansion of the core can occur within the outer shell without failure of said outer shell.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. A material comprising:
   a composite particle having an outer shell, said outer shell having an inner volume; and
   at least two phases within said outer shell occupying said inner volume;
   said at least two phases having a solid phase at least partially made from a lithium alloying material and a non-solid phase selected from the group consisting of liquid, gas and combinations thereof;
   said inner volume of said outer shell being greater than a volume of said solid phase and said lithium alloying material containing an element selected from the group consisting of tin, silicon, aluminum, germanium and copper.

2. The material of claim 1, wherein said outer shell has an outer mean diameter of less than 500 nanometers.

3. The material of claim 1, wherein said outer shell has an outer mean diameter of less than 200 nanometers.

4. The material of claim 1, wherein said outer shell has an outer mean diameter of less than 100 nanometers.

5. The material of claim 1, wherein said outer shell has an outer mean diameter of less than 50 nanometers.

6. The material of claim 1, wherein said solid phase occupies between 5 and 99 percent of said inner volume of said outer shell.

7. The material of claim 1, wherein said outer shell has an average wall thickness of less than 100 nanometers.

8. The material of claim 1, wherein said outer shell has an average wall thickness of less than 50 nanometers.

9. The material of claim 1, wherein said outer shell has an average wall thickness of less than 20 nanometers.

10. The material of claim 1, further comprising a binder, said binder admixed with said material to form an electrode.

11. The material of claim 1, wherein said outer shell has the shape of a hollow sphere.

12. The material of claim 1, wherein said solid phase is a pre-lithiated lithium alloying material.

13. A material comprising:
    a composite particle having an outer shell, said outer shell having an inner volume, an outer mean diameter of less than 500 nanometers and a wall thickness of less than 100 nanometers; and
    a solid phase within said outer shell, said solid phase at least partially made from a Li—X alloy, X being at least one element that alloys with lithium and selected from the group consisting of tin, silicon, aluminum, germanium and copper;
    said inner volume being generally fully occupied by said solid phase.

14. The material of claim 13, wherein said outer mean diameter of said outer shell is less than 200 nanometers.

15. The material of claim 14, wherein said outer mean diameter of said outer shell is less than 100 nanometers.

16. The material of claim 15, wherein said outer mean diameter of said outer shell is less than 50 nanometers.

17. The material of claim 13, wherein said wall thickness of said outer shell is less than 20 nanometers.

18. A material comprising:
    a composite particle having an outer shell, said outer shell having an inner volume, an outer mean diameter of less than 500 nanometers and a wall thickness of less than 100 nanometers; and
    at least two phases within said outer shell occupying said inner volume;
    said at least two phases having a solid phase at least partially made from a lithium alloying material and a non-solid phase selected from the group consisting of liquid, gas and combinations thereof;
    said inner volume of said outer shell being greater than a volume of said solid phase and said lithium alloying material containing an element selected from the group consisting of tin, silicon, aluminum, germanium and copper.

* * * * *